Patented Apr. 3, 1934

1,953,777

UNITED STATES PATENT OFFICE 1,953,777

TITANIUM PHOSPHATE PIGMENT AND PROCESS OF MAKING

Byramji D. Saklatwalla and Holbert Earl Dunn, Crafton, Pa., and Albert E. Marshall, Scarsdale, N. Y., assignors to Southern Mineral Products Corporation, New York, N. Y., a corporation of Delaware No Drawing. Application August 8, 1932, Serial No. 627,932

7 Claims. (Cl. 23—105)

Titanium has been used in the pigment industry in the form of titanium dioxide. The principal merit of titanium dioxide as a pigment has been its inertness combined with a great covering power. Titanium dioxide as such has greatest covering power, but the major bulk of titanium used in the pigment industry has been in the form of an extended pigment. Such extended pigments have been produced by precipitating titanium dioxide on barium or calcium sulphate as the inert material.

Such extended titanium pigments have certain deficiencies, namely, the introduction of the barium or the calcium compounds in the final mixed paint. In very many cases it is desirable to have an extended pigment where a reduced titanium content is obtainable in the finished paint without introducing barium and calcium into the same.

We have found that a pigment may be produced consisting essentially of a titanium phosphate which has high tinting strength and covering power, and in which the titanium dioxide content is reduced without introduction of calcium or barium compounds. Our titanium phosphate pigment may be mixed with lead and zinc pigments, producing a compound pigment free from admixtures of barium and calcium sulphate.

We have found that our pigment can be made economically directly from titanium and phosphate-bearing ores, and particularly from the ore known as Nelsonite. Nelsonite ore contains approximately 21% titanium dioxide and approximately 8% phosphorus pentoxide. This naturally occurring ratio of titanium dioxide to phosphorus pentoxide in the ore is approximately one ratio which we have found advantageous in the titanium phosphate pigment.

In manufacturing our titanium phosphate pigment from the Nelsonite ore, the Nelsonite ore is ground and subjected to the action of strong sulphuric acid. We prefer to use 80% strength sulphuric acid in an amount sufficient to convert the titanium iron and calcium contents of the ore into the sulphates, and to convert the phosphoric acid content into free phosphoric acid. The ore and acid are preferably mixed in an oil jacketed kneading machine which insures the continued mixing of the ore and acid at a temperature of about 350° F.

The sulphatized ore is then leached with water, which dissolves out the soluble sulphates and the phosphoric acid. We prefer to use water to the amount of about 1.2 times the weight of the sulphatized ore. The water solution is filtered from the undissolved residue, and the clarified filtered solution is then treated with metallic iron to convert ferric sulphate into ferrous sulphate. The liquor is then refrigerated and the greater part of the ferrous sulphate is crystallized out. The solution is then diluted with water to bring the total titanium dioxide content of the resultant dilute solution to about 2 to 3%. Sulphuric acid is preferably added so that there is about 10% of free sulphuric acid in the dilute solution.

The dilute solution is then heated, which causes the hydrolytic precipitation of titanium phosphate. The titanium phosphate precipitate is substantially free of the metallic impurities present in the solution, such as the iron, chromium, manganese, and the like.

The titanium phosphate is separated from the solution by filtration, washed, dried and calcined.

The calcined product obtained by this process has a very high degree of whiteness as required for white pigment. It also possesses a high degree of tinting strength and covering power, the tinting strength being four to five times that of standard white lead.

While we prefer to manufacture our titanium phosphate pigment directly from Nelsonite ore because the ore offers a cheap source having approximately one of the titanium dioxide and phosphorus pentoxide ratios which we have found desirable in the completed pigment, the titanium phosphate pigments may be produced from other raw materials. For example, a mixture may be prepared of proper proportions of ilmenite ore and apatite ore, and this artificial mixture of ores treated with sulphuric acid as above described. The titanium phosphate precipitate to be made into pigment may be otherwise prepared, as, for example, by mixing solutions of titanium sulphate and phosphoric acid and hydrolizing the artificially prepared mixture to obtain the titanium phosphate.

Analyses of the precipitate obtained by hydrolizing the sulphuric acid solution obtained by digesting the Nelsonite ore show approximately 57 to 58% $TiO_2$, 19 to 22% $P_2O_5$, and 5 to 6% $SO_3$, the remainder being principally water, together with traces of impurities such as silica. For convenience we speak of this precipitate as titanium phosphate or impure titanium phosphate.

The precipitate after it has been washed and dried is calcined at a temperature of preferably about 1500° F. which drives off most of the $SO_3$. A typical example of the calcined titanium phosphate pigment as made from Nelsonite ore is about 72% titanium dioxide, 26% phosphorus pentoxide, and about 2% impurities such as silica, residual SO$_3$, etc.

The phosphoric acid apparently combines with the titanium dioxide as a definite chemical compound or series of chemical compounds. Microscopic examination indicates a homogeneous and uniform precipitate.

The relative proportions of the titanium dioxide and phosphorus pentoxide contents may be varied, however, over considerable ranges. For example, apatite ore or phosphate rock may be mixed with Nelsonite ore to increase the phosphoric acid content of the solution to be hydrolized, and the phosphoric acid content increased considerably over that obtained in using a straight Nelsonite ore as the raw material. Also, the solutions can be made up of titanium sulphate and phosphoric acid and mixed in any proportions.

While we have specifically described the preferred embodiment of our invention, it is to be understood that the invention may be otherwise embodied and practiced within the scope of the following claims.

We claim:

1. As a new article of manufacture, a pigment containing titanium phosphate as one of its essential constituents, the titanium phosphate analyzing approximately 72% titanium dioxide and 26% phosphorus pentoxide.

2. As a new article of manufacture, a pigment containing finely divided titanium phosphate, the titanium phosphate analyzing approximately 72% titanium dioxide and 26% phosphorus pentoxide.

3. As a new article of manufacture, a pigment material containing finely divided titanium phosphate substantially pure white in color and having a tinting strength approximately four to five times that of standard white lead, the titanium phosphate analyzing approximately 72% titanium dioxide, 26% phosphorus pentoxide and not over about 2% impurities.

4. The process of manufacturing a titanium phosphate pigment, which comprises the steps of forming a dilute solution containing titanium sulphate and phosphoric acid in such proportions as to analyze 57 to 58% titanium dioxide and 19 to 22% phosphorus pentoxide when precipitated by hydrolysis, causing the hydrolytic precipitation of titanium phosphate, separating the titanium phosphate precipitate from the solution, and calcining it.

5. The process of manufacturing a titanium phosphate pigment, comprising the steps of digesting ore containing titanium and phosphate with sulphuric acid, extracting the soluble titanium sulphate and phosphoric acid with water, heating a water solution containing the extracted titanium sulphate and phosphoric acid so as to cause the hydrolytic precipitation of titanium phosphate, separating the precipitate from the solution, and calcining it.

6. That step in the process of manufacturing a titanium phosphate pigment, which consists in heating a solution containing titanium sulphate and phosphoric acid so as to cause the hydrolytic precipitation of titanium phosphate, the contents of the solution being so proportioned that the precipitate will analyze approximately 57 to 58% titanium dioxide and approximately 19 to 22% phosphorus pentoxide.

7. That step in the process of manufacturing a titanium phosphate pigment, which consists in causing the hydrolytic precipitation of titanium phosphate from a solution containing titanium sulphate and phosphoric acid in such proportions as to analyze 57 to 58% titanium dioxide and 19 to 22% phosphorus pentoxide when hydrolytically precipitated.

BYRAMJI D. SAKLATWALLA.
HOLBERT EARL DUNN.
ALBERT E. MARSHALL.